United States Patent [19]

Fischer et al.

[11] 4,091,197

[45] May 23, 1978

[54] PROCESS FOR THE POLYMERIZATION OF VINYL CHLORIDE MICRO-SUSPENSION WITH METAL COMPOUNDS

[76] Inventors: Nicolas Fischer, 23 rue Cavendish, 75019, Paris; Jacques Boissel, 352 Pare de Cassan, 95290, L'Isle-adam; Thomas Kemp, 57 rue Paul uzillant Couturier, 92300, Levallois-Perret; Henri Eyer, Le Courtil Fleuri, rue de Paris, 60170, Ribecourt, all of France

[21] Appl. No.: 637,938

[22] Filed: Dec. 5, 1975

Related U.S. Application Data

[63] Continuation of Ser. No. 476,050, Jun. 30, 1974, abandoned.

[30] Foreign Application Priority Data

Jun. 8, 1973 France .............................. 73 20882

[51] Int. Cl.$^2$ .................... C08F 2/18; C08F 114/06; C08F 214/06
[52] U.S. Cl. .............................. 526/91; 260/29.6 R; 526/93; 526/94; 526/192; 526/193; 526/194; 526/234; 526/236; 526/238; 526/909; 526/213; 526/344.2
[58] Field of Search ............... 526/91, 93, 94, 192, 526/344, 345

[56] References Cited

U.S. PATENT DOCUMENTS

| | | | |
|---|---|---|---|
| 2,996,490 | 8/1961 | Rowland | 260/92.8 |
| 3,057,831 | 10/1962 | Holdsworth | 260/78.5 |
| 3,060,160 | 10/1962 | Boussu | 260/88.3 |
| 3,067,186 | 12/1962 | Bessant | 260/92.8 |
| 3,311,579 | 3/1967 | Donat | 260/23 |
| 3,560,454 | 2/1971 | Büning | 260/78.5 |
| 3,668,194 | 6/1972 | Shen | 260/86.3 |
| 3,725,367 | 4/1973 | Kemp | 260/80.81 |
| 3,879,364 | 4/1975 | Kemp | 260/92.8 |

OTHER PUBLICATIONS

Konish, A. et al., J. of Polymer Science, 54, 209–219 (1961).

*Primary Examiner*—Christopher A. Henderson, Jr.
*Attorney, Agent, or Firm*—McDougall, Hersh & Scott

[57] ABSTRACT

Micro-suspension polymerization of vinyl chloride monomers and comonomers with a seed in the form of a previously prepared dispersion of the polymer or copolymer containing all of the organo-soluble initiator required for the polymerization, in which the initiator is activated during the polymerization by the addition of an organo-metallic complex of a water-soluble metal salt reacted with a complexing agent.

11 Claims, 1 Drawing Figure

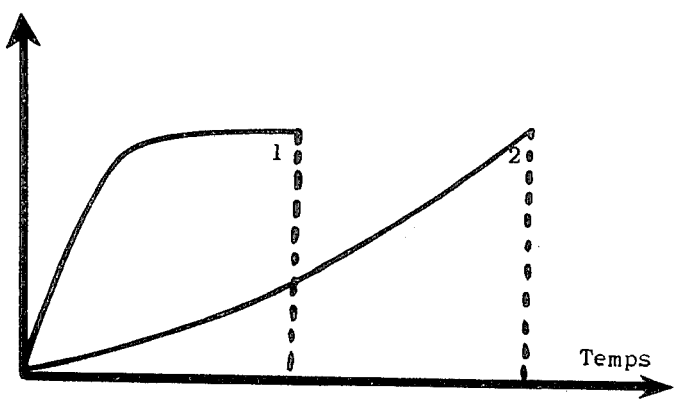

PROCESS FOR POLYMERIZATION OF VINYL CHLORIDE MICRO-SUSPENSION WITH METAL COMPOUNDS

This application is a continuation of our copending application Ser. No. 476,050, filed June 3, 1974, and entitled "Process for Polymerization of Vinyl Chloride in Micro-Suspension", and now abandoned.

The present invention is concerned with a method for the polymerization and copolymerization of vinyl chloride in micro-suspension. It also relates to the polymers and copolymers resulting therefrom.

By polymerization in micro-suspension is meant polymerization to the presence of organo-soluble initiators of at least one monomer dispersed, by vigorously acting mechanical means, in an aqueous medium containing an emulsifier or a large quantity of a protective colloid in that it is stabilizing, for the purpose of obtaining a dispersion of particles, the diameter of which is less than 5 microns.

It is known that, at normal polymerization temperatures, the conventional initiators of the polymerization of vinyl chloride cause the kinetics of the polymerization or copolymerization reactions to be self-accelerating, and this results on the one hand in cooling difficulties and therefore poor utilization of the reaction vessel, and on the other hand in incomplete utilization of these initiators, since a relatively large quantity of initiator has to be used if polymerization is to be carried out at a rate that is acceptable for industrial purposes.

To overcome these difficulties, it has been proposed to use initiators having more rapid decomposition, but it has been found that these do not give good results in the cause of polymerization in micro-suspension. It has also been proposed to accelerate the decomposition of the initiator by the presence of transition metal salts, particularly in low-temperature polymerization operations which yield vinyl chloride polymers having very high molecular weights and/or exhibit a crystalline structure, but the kinetics of the reaction is still self-accelerated.

Also, it is known that, in polymerization in micro-suspension, the use of a seeding product, containing the initiator necessary for polymerization, enables incrustation in the reaction vessel to be almost completely suppressed, and self-acceleration of the reaction to be reduced to some extent, particularly when the proportion of the seeding product is high; however the improvement achieved is limited.

The method, in accordance with the practice of this invention, avoids the phenomenon of self-acceleration and the disadvantages connected therewith, and enables polymerization or copolymerization of vinyl chloride to be carried out at the usual temperatures and at the highest possible reaction rate for a given apparatus, with better utilization of the initiator, i.e., the use of smaller quantities thereof, and very slight incrustation with resultant optimum utilization of the reaction vessel.

According to the invention, the method of preparing polymers and copolymers of vinyl chloride consists in polymerizing the corresponding monomer or monomers in micro-suspension in the presence of a seeding product in the form of a dispersion of particles of vinyl chloride polymer or copolymer previously prepared in micro-suspension, the particles thereof containing all the organo-soluble initiator necessary for polymerization, the method being characterized in that the initiator is activated by an organo-soluble metallic complex formed throughout the polymerization by reacting a water-soluble metallic salt with a progressively introduced complexing agent.

The metals that may be used are, in particular, iron, copper, cobalt, nickel, zinc, tin, titanium, vanadium, manganese, chromium, and silver, in the form of water-soluble salts, such as sulphates, chlorides, nitrates and acetates, in a quantity such that the molar ratio of metallic salt to initiator is between 0.1 and 10 and preferably 0.1 and 2.

These salts may be introduced into the reaction zone before or during polymerization.

The complexing agents which may be used are compounds which are capable of causing the metal to change from its water-soluble form to a form soluble in vinyl chloride and which have no inhibiting action on the polymerization and on the activation of the initiator by the metal. Compounds that meet these conditions are monocarboxylic acids which are only slightly soluble in water, such as perfluorobutyric acid, $\alpha$-bromolauric acid, sulphosalicylic acid, naphtenic acid and octoic acid; polycarboxylic acids such as succinic acid, tartric acid, maleic acid, and dihydroxymaleic acid, and the corresponding anhydrides; alkylphosphoric acids such as di(2-ethyl) hexylphosphoric acid; lactones such as ascorbic acid and its esters, and $\gamma$-butyrol-acetone; ketones, having in the $\gamma$ or $\beta$ position, groups which activate the carbonyl function, such as acetylacetone, 1,3-dihydroxy acetone and benzoin; and carbazones, such as diphenylthiocarbazone.

The proportions of complexing agent used are a function of the polymerization temperature, the cooling capacity of the reaction vessel and the purity of the reagents. They may reach molar stoichimetry in relation to the metallic salt.

In the presence of the metallic salt, this complexing agent yields an organo-soluble complex which carries the metal into the organic phase wherein it exercises an activating effect upon the initiator. The initiator can thus at will be activated by varying the quantity of complexing agent and the time at which it is introduced into the reaction medium, so that the kinetics of the polymerization can be regulated at all times. Polymerization which, in the absence of an activator, is initially slow, is vigorously activated at the outset in the method of the invention, then less and less as the reaction continues. Thus, because of the optimum use of the cooling capacity of the reaction vessel, polymerization can be achieved in the minimum time.

Such a result is not achieved if all the complexing agent is introduced at the beginning. In such instance, activation of the initiator would in fact be too rapid at the commencement of polymerization; the initiator would decompose too quickly and the reaction would not be completed because of the absence of initiator.

In a modified form of the method of the invention, the initiator is activated by progressively introducing an organo-soluble-metallic complex prepared beforehand by reacting metallic salts and complexing reagents as described above.

These complexes are used in proportions such that the molar ratio of metallic complex to initiator is between 0.1 and 10.

Activation of the initator by the complex may be interrupted at any time by ceasing to introduce the complexing agent or complex, and/or by causing the metallic ion to change from its organo-soluble form to its water-soluble form. This is readily achieved by adding to the reaction medium an sequestering agent selected from the alkaline salts of the acids of the ethylene-diamine tetracetic acid group which, in addition to this acid, is represented by nitrilotriacetic acid, diethylenetriamine pentacetic acid and N(2-hydroxyethyl) ethylene diamine triacetic acid. The sequestering agent is used in proportions up to the molar stoichiometry in relation to the metallic salt.

The seeding product, necessary for polymerization, is prepared in accordance with the conventional techniques of polymerization in micro-suspension. For example, use is made of water, vinyl chloride, with or without a comonomer, an anionic emulsifier and an organo-soluble initiator. The monomer or monomers is or are finely dispersed in the water with the aid of a vigorously acting mechanical means, such for example as a colloid mill, a high-speed pump, a vibrator or ultrasonic apparatus. The micro-suspension obtained is then heated, under autogenous pressure and with moderate agitation, to a temperature depending upon the molecular weight of the product that it is desired to be obtained.

The seeding product is in the form of a dispersion of polymer or copolymer particles having a diameter of between 0.05 and 2 microns.

To enable the method to be carried out, the particles of seeding product should contain all the initiator necessary for carrying out the polymerization in accordance with the invention. This quantity is between 0.1 and 5% by weight of the polymer of the seeding product, and is introduced prior to polymerization of said product.

Suitable initiators, soluble in the monomers, are represented by organic peroxides, such as diacyl peroxides which include lauroyl peroxide, decanoyl peroxide, and caproyl peroxide.

In the polymerization method, in accordance with the practice of this invention, the quantity of seeding product used should be such that the polymer that it contains represents 0.5 to 10% by weight of the total monomer or monomers to be polymerized + the seeding polymer.

The quantity of initiator present in relation to that of the monomer to be polymerized is thus very small compared with the quantity used in the known methods.

Use may also be made of a greater quantity of product yielding proportions of polymer in excess of 10%, but such quantity is of little interest since the amount of polymer is then very large in relation to the monomer or monomers, and the advantages provided by the method are thus reduced.

The seeding product present in the polymerization medium is sufficient to ensure dispersion of the monomer without it being necessary to have recourse to further vigorous dispersion of the medium.

The monomers that can be copolymerized with vinyl chloride are those generally used in the conventional systems of copolymerizing with vinyl chloride. These include the vinyl esters of the monocarboxylic and polycarboxylic acids such as vinyl acetate, propionate, and benzoate; aliphatic, cycloaliphatic and aromatic esters, amides, and nitriles of unsaturated monocarboxylic or polycarboxylic acids such as acrylic acid, methacrylic acid, maleic acid, and fumaric acid; allyl halogenides, vinyl halogenides, and vinylidene halogenide; alkylvinyl ethers; and olefins. The proportions of comonomer may be up to 25% of the copolymer.

To increase the stability of the micro-suspension, it may be advantageous to add prior to and/or during the course of polymerization, an anionic emulsifier in proportions of up to 2% by weight of the monomer or monomers. This emulsifier may be the same as that or those used in the preparation of the seeding product. It may be selected conventional conventionl products, such as fatty acid soaps, alkylsulphates, alkylsulphonates, alkylarylsulphonates, alkylsulphosuccinates, and alkylphosphates.

There may be associated with this emulsifier, a non-ionic surface-active agent, such as for example the condensates of ethylene oxide or propylene oxide on various hydroxylated organic compounds.

The quantity of water to be used in the polymerization method of this invention must be such that the ratio of the weight of the monomer or monomers + the polymer of the seeding product to that of the water (including that of the seeding product) is between 0.3 and 1.5.

The polymerization temperature, which is determined by the quality of the polymer that it is required to obtain, is generally between 30° and 70° C.

The method of the invention is particularly suitable for use in continuous polymerization, as described in French Pat. No. 1,485,547, of Pechiney-Saint-Gobain. In this instance, the introduction of the complexing agent or of the complex enables optimum reaction kinetics to be maintained by ensuring a constant and high conversion rate.

The present invention also relates to the polymers and copolymers of vinyl chloride prepared by the above described method, after separation of said polymers and copolymers from the polymerization medium by any known procedure, such as filtration, drying by coagulation, flaking, centrifugal decantation or atomization.

The polymers and copolymers of this invention can be used in the manufacture of sheets, films, threads, hollow bodies, cellular materials and moulded articles produced by calendering, extrusion, blown extrusion, injection and moulding; they may also be used for obtaining coatings, cellular materials moulded articles by any known method using plastisols and by coating, rotation-moulding and dip-moulding techniques.

Some non-limiting examples illustrating how the invention may be carried out are hereinafter given.

EXAMPLE 1

In a 25 $m^3$ reaction vessel, fitted with a stirring means, there were introduced:
12,000 kg of water,
1,200 kg of a seeding product, prepared by polymerization in micro-suspension and having a concentration of 33.3% i.e., 400 kg of polyvinyl chloride containing 6 kg of lauroyl peroxide, and having a mean particle size of 0.4 micron, 60 kg sodium dodecylbenzene sulphonate, 0.5 kg copper sulphate, and
10,000 kg vinyl chloride.

The mixture was then heated to 52° C. under autogenous pressure, and this temperature was maintained throughout the reaction.

As soon as the mixture reached 52° C., the introduction of a 4 g/liter aqueous solution of ascorbic acid was begun. Acid was added at a rate of 65 g/hr for 3 hours, then 45 g/hr for the next 3 hours, and 20 g/hr until the reaction was completed.

After 9 hours, a drop in pressure, characteristic of the termination of the reaction, was observed. Introduction of ascorbic acid was then stopped, and the unreacted monomer was degassed.

There were obtained 22,200 kg of a polymer dispersion, having a concentration of 42.2% by weight, i.e., an actual transformation rate of 89.7% by weight of the vinyl chloride used.

The thin polymer film on the walls of the reaction vessel represented only 0.1% by weight of the vinyl chloride used.

The diameter of the particles obtained was 1.1 micron.

After atomization and crushing, the polymer obtained had a viscosity index of 130, measured in the manner prescribed by French Specification T 51-103.

A plastisol, prepared by mixing 100 parts by weight of the polyvinylchloride obtained and 60 parts by weight of dioctylphthalate, had a viscosity of 20 poises measured by means of the Brookfield RTV viscosimeter (needle No. 7 - 20 rpm).

Various tests, based on prior-art procedure, were carried out for comparison purposes better to demonstrate the importance of the method of the invention.

A. Unseeded and Unactivated Polymerization in Micro-suspension

In the same reaction vessel as that used in Example 1 there were introduced:
12,000 kg of water,
8 kg lauroyl peroxide,
100 kg sodium dodecylbenzene sulphonate, and
10,000 kg vinyl chloride.

The mixture was homogenized to obtain a micro-suspension of which the organic phase had a particle-size of 1 micron. The mixture was then heated to 52° C. under autogenous pressure and this temperature was maintained throughout the reaction.

The reaction rate was irregular, being initially very slow, then accelerating, and necessitating maximum cooling of the reaction vessel during the last 2 hours. The reaction was completed under 18 hours. The unreacted monomer was degassed and there were obtained 20,300 kg of a dispersion having a 41% by weight concentration, which corresponds to a transformation rate of 83% by weight of the vinyl chloride used. Incrustations that formed on the walls of the reaction vessel represented 1% by weight of the vinyl chloride used.

The FIGURE 1 illustrates the progression of the rate of polymerization in Example 1 (curve 1) and in test A (curve 2).

It was found that, compared with the method of the invention and although a greater quantity of initiator was used, the reaction time was twice as long, the conversion rate lower, and the amount of incrustation 10 times greater.

B. Seeded, but Unactivated Polymerization in Micro-suspension

Example 1 was repeated but without introducing copper sulphate and ascorbic acid.

After 15 hours reaction time, there were obtained 22,000 kg of a dispersion having a 40.5% by weight concentration, i.e., a conversion of 85.1% by weight of the vinyl chloride used.

Incrusted material, representing 0.6% of the vinyl chloride used, was removed from the walls of the reaction vessel.

The diameter of the particles obtained was 1.08 micron.

In comparison with Example 1, it was found that activation of the initiator, in accordance with the method of the invention, enables the reaction to be carried out in 9 hours instead of 15 hours, increases transformation rate by 4% and reduces the amount of incrustation to one-sixth.

C. Unseeded and Unactivated Polymerization in Micro-suspension in the Presence of Rapidly Decomposing Initiators The following were charged into a 120-liter reaction vessel fitted with stirring means:
60 kg water
0.160 kg. lauroyl peroxide
0.120 kg isopropyl percarbonate
0.4 kg sodium dodecylbenzene sulphonate, and
40 kg vinyl chloride.

The mixture was homogenized to obtain a micro-suspension of which the organic phase had a particle-size of 1 micron.

The mixture was then heated to 52° C. under autogenous pressure and was maintained at this temperature throughout the reaction.

After 12 hours reaction time, there was obtained a coarse dispersion containing a large quantity of coagulates. Furthermore, the incrustation formed on the walls of the reaction vessel represented 30% of the monomer used.

EXAMPLE 2

Example 1 was repeated usng a seeding product of which the particles had a mean diameter of 0.25 microns, and polymerization was carried out at 42° C.

After 12 hours, there were obtained 22,100 kg of a polymer dispersion having a concentration of 42.4% by weight, i.e., with an actual transformation rate of 89.7% by weight of the vinyl chloride used.

The mean diameter of the particles obtained was 0.6 micron.

The polymer had a viscosity index of 180.

A plastisol prepared by mixing 100 parts by weight of the polyvinylchloride obtained and 60 parts by weight of dioctylphthalate, had a viscosity of 75 poises.

EXAMPLE 3

The same procedure was used as in Example 1 but the 10,000 kg vinyl chloride of the earlier Example were replaced by 9,300 kg of vinyl chloride and 700 kg of vinyl acetate.

After a reaction time of 9½ hours, there were obtained 22,400 kg of a copolymer dispersion containing 4.9% of vinyl acetate, of which the concentration was 42.6% by weight, corresponding to an actual transformation rate of 91.4% by weight of the monomers used.

The mean diameter of the particles obtained was 1.1 micron.

The copolymer had a viscosity index of 130. A plastisol, prepared by mixing 100 parts by weight of the copolymer obtained and 60 parts by weight of dioctylphthalate, had a viscosity of 30 poises and a gelling temperature of 144° C., measured in accordance with the procedure described by Heinrichs in Modern Plastics, April, 1964, page 165.

EXAMPLE 4

There were introduced into the same reactor as that used for Example 1:
- 12,600 kg water,
- 1,070 kg of a seeding product having a 39% concentration i.e., 417.3 kg of polyvinylchloride containing 6.3 kg lauroyl peroxide, and comprising particles of a mean diameter of 0.4 micron,
- 84 kg sodium dodecylbenzene sulphonate,
- 8,400 kg vinyl chloride, and
- 0.42 kg copper sulphate.

The mixture was heated to 52° C., and 840 g dihydroxymaleic acid were gradually introduced over a period of 12 hours; 105 g/hr during the first 4 hours, 65 g/hr during the next 4 hours and 40 g/hr during the final 4 hours.

There were obtained 20,970 kg of a polymer dispersion having a concentration of 36.9%, corresponding to a transformation rate of 87.1% by weight of the monomer used. A film, representing 0.12% by weight of the vinyl chloride used, was collected from the walls of the reaction vessel. The diameter of the particles obtained was 1.1 micron.

EXAMPLE 5

The procedure of Example 4 was repeated but with the dihydroxymaleic acid replaced by succinic acid.

After 14 hours reaction time, there were obtained 21,070 kg of a polymer dispersion having a 37% concentration corresponding to a transformation rate of 87.8%. The weight of the incrusted material was only 0.15% by weight of the vinyl chloride used.

The diameter of the particles was 1.08 micron.

EXAMPLE 6

The same procedure as that of Example 4 was used but the copper sulphate and dihydroxymaleic acid were replaced by 840 g vanadium acetylacetonate.

The latter was gradually introduced into the mixture at 52° C. in 12½ hours at a rate of 105 g/hr during the first 4 hours, 65 g/hr during the next 4 hours, and 40 g/hr during the final 4½ hours.

There were obtained 20,870 kg of a polymer dispersion of which the concentration was 36.5%, corresponding to a conversion rate of 85.5%. The amount of incrustation was equal to 0.18% by weight of the monomer used.

The diameter of the particles was 1.09 microns.

EXAMPLE 7

A number of tests were carried out using different activating agents and under the following conditions:

The following were introduced into a 200 ml glass flask after it had been evacuated and then flushed with gaseous vinyl chloride:

| | | |
|---|---|---|
| de-ionized water | 60 | ml |
| a seeding product, prepared by polymerization in micro-suspension and having a concentration of 34.9% corresponding to 3 g polyvinylchloride containing 0.04 g lauroyl peroxide and having a mean particle diameter of 0.4 micron | 10.5 | g |
| sodium dodecylbenzene sulphonate | 0.18 | g |
| vinyl chloride | 30 | g |
| an activating agent consisting either of 10 × 10$^{-5}$ mol. of a metallic salt and 5 × 10$^{-5}$ mol. of a complexing agent, or of 10 × 10$^{-5}$ mol. of a metallic complex prepared beforehand. | | |

The flask was then hermetically sealed, placed in a water bath thermostatically controlled at 52° C., and shaken. The flask was maintained at this temperature for 5 hours, then cooled and degassed, and the water was evaporated to provide the finished polymer.

The various activating agents used and the results obtained are shown in the following table.

This table clearly shows the effect of the activating agents upon the commencement of polymerization.

| Test (Reference) | Metallic Salt | Complexing Agent | Polymer % by wt. of vinyl chloride |
|---|---|---|---|
| A | 0 | 0 | 0.8 |
| B | copper sulphate | sulphosalicylic acid | 16 |
| C | " | naphtenic acid | 3 |
| D | " | octoic acid | 3 |
| E | " | succinic acid | 4.4 |
| F | " | tartric acid | 16 |
| G | " | maleic anhydride | 4.1 |
| H | " | di(2-ethyl)hexyl-phosphoric acid | 10.2 |
| I | " | ascorbic acid | 23 |
| J | " | γ-butyrolactone | 14 |
| K | " | benzoin | 2.8 |
| L | " | diphenylthiocarbazone | 3 |
| M | iron sulphate | ascorbic acid | 23 |
| N | nickel sulphate | " | 20 |
| O | zinc sulphate | " | 25 |
| P | vanadium sulphate | " | 59 |
| Q | manganese sulphate | " | 12 |
| R | chromium sulphate | " | 23 |
| S | tannic chloride | " | 33 |
| T | cobalt nitrate | " | 10 |
| U | silver nitrate | " | 8.6 |
| V | Titanium acetylacetonate | | 1.3 |
| W | Chromium acetylacetonate | | 6.6 |
| X | Nickel acetylacetonate | | 6.9 |

We claim:

1. A method of preparing polymers and copolymers of vinyl chloride which consists in the polymerization of the corresponding monomer or monomers in microsuspension in the presence of a seeding product in the form of a dispersion of particles of the polymer or copolymer of vinyl chloride prepared beforehand in micro-suspension, of which the particles contain all of the organo-soluble initiator necessary for polymerization, and activating the initiator by an organo-soluble metallic complex formed throughout polymerization by reacting a water-soluble salt of a metal selected from the group consisting of iron, copper, cobalt, nickel, zinc, tin, titanium, vanadium, manganese, chromium and silver with a complexing agent progressively introduced throughout the polymerization at a rate to regulate the polymerization to maintain a relatively constant conversion rate and in which the ratio of metal salt to initiator is between 0.1 and 10.

2. A method according to claim 1, in which the complexing agents are compounds capable of causing the metal to change from its water-soluble form to an organo-soluble form and which have no inhibiting effect on polymerization and activation.

3. A method according to claim 2, in which the compounds are selected from the group consisting essentially of monocarboxylic acids, polycarboxylic acids, alkylphosphoric acids, lactones, ketones, and carbazones.

4. A method according to claim 1, in which the proportion of complexing agent may reach molar stoichiometry in relation to the metallic salt.

5. A method of claim 1, in which the initiator is activated by the progressive introduction of the metallic complex prepared by reacting salts of a metal selected from the group consisting essentially of iron, copper, cobalt, nickel, zinc, tin, titanium, vanadium, manganese, chromium, and silver with complexing agents with a compound selected from the group consisting essentially of monocarboxylic acids, polycarboxylic acids, alkylphosphoric acids, lactones, ketones, and carbazones.

6. A method according to claim 1, in which activation is interrupted by one of the methods including ceasing to introduce complexing agent or complex by adding a sequestering agent selected from the alkaline salts of acids of the ethylene diamine tetracetic group.

7. A method according to claim 1, in which the particles of the product have a diameter of between 0.05 and 2 microns.

8. A method according to claim 1, in which the particles of the seeding product contain organo-soluble initiator in an amount of 0.01% to 5% by weight of the polymer.

9. A method according to claim 8, in which the initiator is a diacyl peroxide.

10. A method according to claim 1, in which the quantity of seeding product used is such that the polymer contained therein represents 0.05% to 10% by weight of the total monomer or monomers + the seeding polymer.

11. A method according to claim 1, in which the polymerization temperature is between 30° and 70° C.

* * * * *